(12) United States Patent
Sugiyama et al.

(10) Patent No.: US 11,795,986 B2
(45) Date of Patent: Oct. 24, 2023

(54) EXTERNAL SCREW MEMBER

(71) Applicant: TOPURA CO., LTD., Hadano (JP)

(72) Inventors: Minoru Sugiyama, Hadano (JP);
Shigeto Mori, Hadano (JP); Mayumi Matsuno, Hadano (JP); Naoki Horiuchi, Hadano (JP)

(73) Assignee: TOPURA CO., LTD., Hadano (JP)

( * ) Notice: Subject to any disclaimer, the term of this patent is extended or adjusted under 35 U.S.C. 154(b) by 309 days.

(21) Appl. No.: 17/160,151

(22) Filed: Jan. 27, 2021

(65) Prior Publication Data

US 2021/0231157 A1 Jul. 29, 2021

(30) Foreign Application Priority Data

Jan. 28, 2020 (JP) .................. 2020-011669

(51) Int. Cl.
*F16B 25/00* (2006.01)
*F16B 5/00* (2006.01)

(52) U.S. Cl.
CPC ................. *F16B 5/0052* (2013.01)

(58) Field of Classification Search
CPC .. F16B 25/0052; F16B 25/04; F16B 25/0042; F16B 25/0021; F16B 25/0026; F16B 25/103; F16B 25/0057; F16B 25/0073; F16B 35/06; F16B 35/48; F16B 39/30; F16B 39/28; B21H 3/02
USPC ..... 411/307, 311, 387, 387.4, 417, 118, 420, 411/929
See application file for complete search history.

(56) References Cited

U.S. PATENT DOCUMENTS

| | | | | |
|---|---|---|---|---|
| 1,933,332 | A | * 10/1933 | May | ................. F16B 39/30 411/418 |
| 7,214,020 | B2 | * 5/2007 | Suzuki | ............... F16B 25/0021 411/417 |
| 2005/0265805 | A1 | 12/2005 | Suzuki | |
| 2016/0131171 | A1 | 5/2016 | Hamada | |

FOREIGN PATENT DOCUMENTS

JP 5909747 B2 4/2016

OTHER PUBLICATIONS

Chinese Office Action dated Jun. 24, 2022 (corresponding to Cn 202110110319.X).

* cited by examiner

*Primary Examiner* — Victor D Batson
*Assistant Examiner* — Carl J Carlson
(74) *Attorney, Agent, or Firm* — Harness, Dickey & Pierce, P.L.C.

(57) ABSTRACT

An external screw member includes a parallel screw portion and a tapered screw portion provided on a side further toward a tip end than the parallel screw portion, and a plurality of sets of step portion and a transition screw thread portion are provided on at least one of the parallel screw portion and the tapered screw portion, the step portion having a reduced thread height in a radial direction and the transition screw thread portion gradually increasing in diameter from the step portion in an anti-driving rotation direction so as to reach a thread height of a normal screw thread portion. A top portion of the transition screw thread portion is positioned at an offset toward a pressure side relative to a position of a regular screw pitch in a minimum diameter portion of the step portion, and transitions to the regular screw pitch in the anti-driving rotation direction.

18 Claims, 4 Drawing Sheets

Figure 1A:
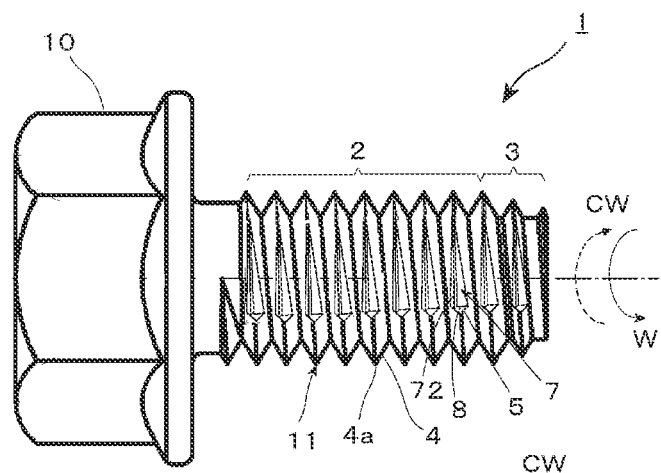

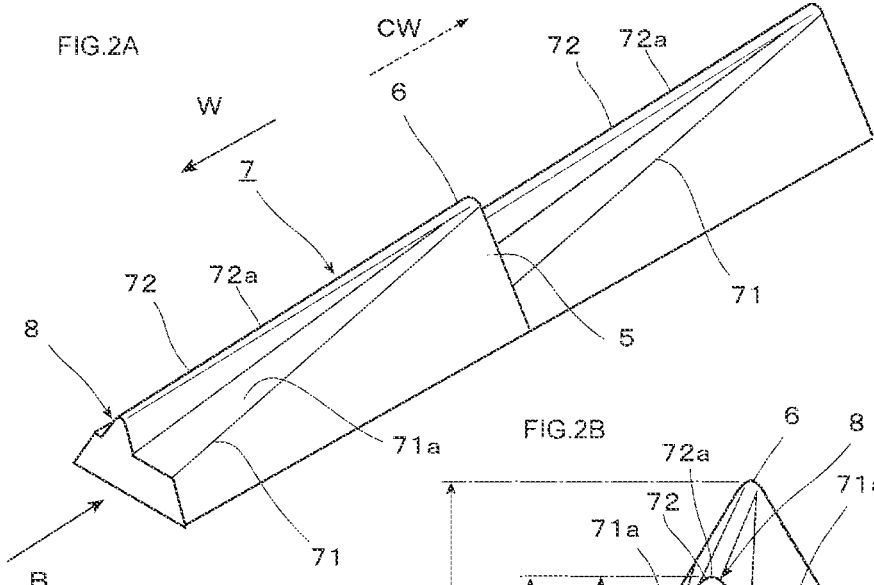
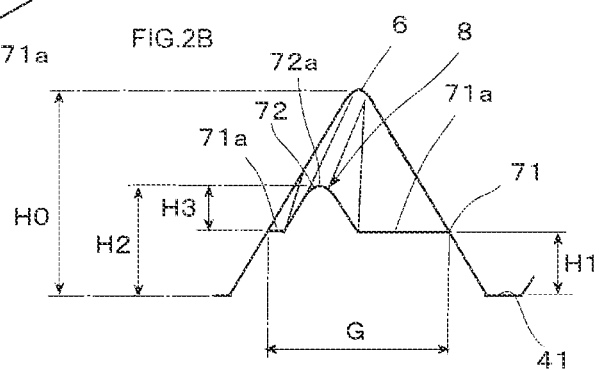
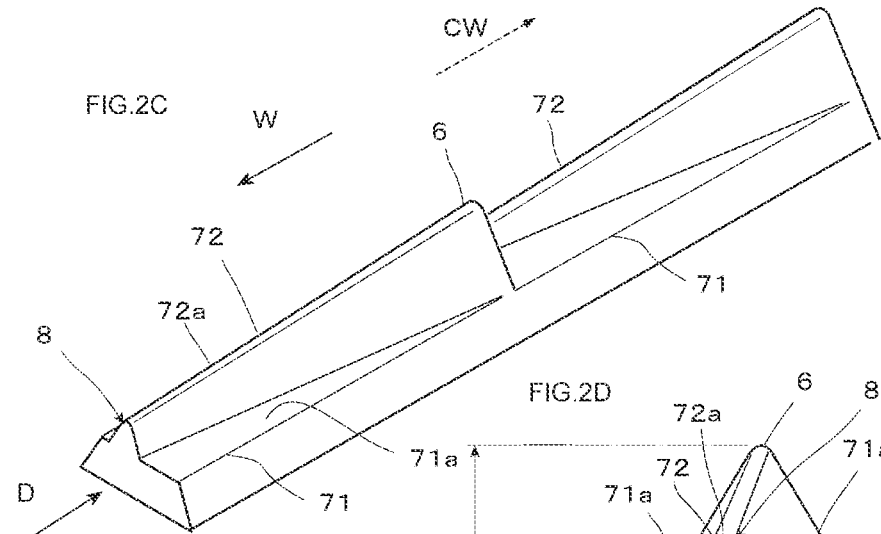
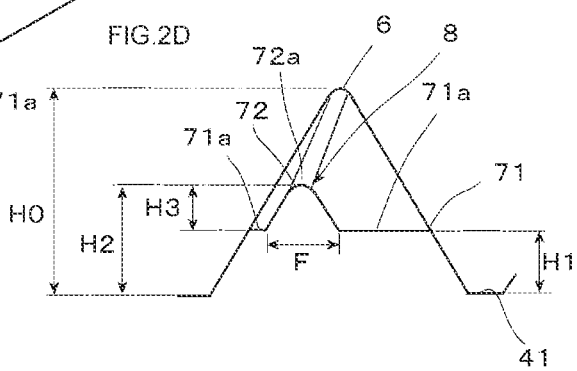

EXTERNAL SCREW MEMBER

CROSS-REFERENCE TO RELATED APPLICATIONS

This application claims the benefit and priority of Japanese Patent Application No. 2020-011669, filed on Jan. 28, 2020. The entire disclosure of the above application is incorporated herein by reference.

FIELD

The present disclosure relates to an external screw member that can be used as a tapping screw that is screwed and tightened while forming (through plastic deformation) a screw thread in a pilot hole in which an internal thread has not been cut, and that can also be used as a bolt that can be screwed and tightened to an internal thread (a nut or the like) to which foreign matter generated by coating, sputtering, or the like is adhered.

BACKGROUND

As a conventional example of this type of screw, a self-tapping screw (a tapping screw) such as that disclosed in Japanese Patent No. 5909747 is available. In this self-tapping screw, driving torque is suppressed to a low level by providing a tapered reduced diameter portion on the tip end of a shaft portion, and forming, on the screw thread portion of the reduced diameter portion of the external screw, a plurality of sets of a maximum diameter portion and a transition screw thread portion, the maximum diameter portion having a step portion in a position that forms the rear side during driving rotation and the transition screw thread portion increasing gradually in diameter from the step portion toward the adjacent maximum diameter portion.

However, in the self-tapping screw of Japanese Patent No. 5909747, if a step portion and a transition screw thread portion that mate with the formed internal thread exist in a fully tightened state, axial force is concentrated in a narrow range of the internal thread and an apex portion serving as the maximum diameter portion, and when a load is applied up to an equivalent axial force to the force applied to a normal screw thread with a circular cross-section, the internal thread may break.

To solve this problem, the step portion may be set in a location other than the part that is fitted to the internal thread, such as the tip end portion, but in this case, driving torque can be suppressed to a low level during initial driving, however, as the driving depth increases, the contact area between a parallel screw portion and the formed internal thread increases, leading to an increase in driving torque due to frictional resistance.

Particularly in recent years, a self-tapping screw of this type has also been used in an application as a bolt that is screwed and tightened to an internal thread (a nut or the like) to which foreign matter generated by coating, sputtering, or the like is adhered. When used in an application as a bolt, the self-tapping screw requires greater axial force (fastening force) and more stable tightening force than a tapping screw, but since axial force is concentrated in the narrow range of the apex portion serving as the maximum diameter portion, the risk of the internal thread breaking increases, and therefore the range of the step portion is limited.

Furthermore, when the driving depth increases, similarly to a case in which the self-tapping screw is used as a tapping screw, the contact area between the parallel screw portion and the formed internal thread increases, leading to an increase in tightening torque.

SUMMARY

The present disclosure has been made to solve the conventional problems described above, and an object thereof is to provide an external screw member which can be used as both a tapping screw and as a bolt that can be tightened to an internal thread (a nut or the like) having foreign matter, generated by coating, sputtering, or the like, adhered thereto, and with which sufficient axial force (tightening torque) can be acquired while achieving a reduction in driving torque.

To achieve the object described above, an external screw member according to the present disclosure includes a parallel screw portion and a tapered screw portion provided on a side further toward a tip end than the parallel screw portion. A plurality of sets of a step portion and a transition screw thread portion are provided on at least one of the parallel screw portion and the tapered screw portion, the step portion having a reduced thread height in a radial direction and the transition screw thread portion gradually increasing in diameter from the step portion in an anti-driving rotation direction so as to reach a thread height of a normal screw thread portion.

A top portion of the transition screw thread portion is positioned at an offset toward a pressure side relative to a position of a regular screw pitch in a minimum diameter portion of the step portion, and transitions to the regular screw pitch as the diameter thereof increases in the anti-driving rotation direction.

According to the present disclosure, during driving, an internal thread is formed along the transition screw thread portion, which gradually increases in diameter from the minimum diameter portion, and therefore initial driving torque can be reduced.

In the minimum diameter portion, the top portion of the transition screw thread portion is offset toward the pressure side relative to the regular screw pitch, and therefore contact area with the internal thread can be secured when axial force is applied. Hence, limitations on the position in which to provide the step portion can be eliminated, with the result that the step portion is not limited to the tapered screw portion and can be provided on the parallel screw portion that is fitted to the internal thread or over the entire region of the screw. As a result, an increase in driving torque proportionate to the length of the parallel screw portion can be suppressed even in relation to a deep pilot hole.

The diameter of the top portion of the transition screw thread portion in the minimum diameter portion is preferably not smaller than the inner diameter of the formed internal thread. By setting the diameter of the top portion of the transition screw thread portion not smaller than the inner diameter of the internal thread, contact area can be secured with the internal thread over the entire circumference of the screw.

More specifically, the screw thread height of the top portion of the transition screw thread portion in the minimum diameter portion is preferably within a range of not less than 20% and not more than 90% of the screw thread height of a maximum diameter portion.

At less than 20%, when the external screw member is fitted to the internal thread, the effect of alleviating axial force concentration by increasing the contact area decreases.

At more than 90%, although the contact area increases, frictional resistance also increases, leading to an increase in driving torque.

The number of sets of the plurality of sets of the step portion and the transition screw thread portion is preferably set at not less than two and not more than eight on each turn of the screw thread portion.

When fewer than two sets are provided, the effect of alleviating axial force concentration decreases, and when more than eight sets are provided, the effect of reducing the driving torque decreases.

The transition screw thread portion can be configured to include a trapezoidal screw thread having the regular screw pitch, and a reduced screw thread portion that is provided on a top portion of the trapezoidal screw thread portion, is offset toward the pressure side relative to the regular screw pitch, and forms a top portion of the transition screw thread.

The thread height of the trapezoidal screw thread portion in the minimum diameter portion is preferably set at not less than 10% and not more than 50% of the thread height of the screw thread portion of the external screw.

At less than 10%, the life expectancy of the mold decreases, and at more than 50%, the effect of reducing the driving torque decreases.

The reduced screw thread portion is offset toward the pressure side relative to the regular screw pitch within a range not projecting from a pressure side flank surface of the trapezoidal screw thread portion.

The thread height of the trapezoidal screw thread portion may be configured to gradually increase in the anti-driving rotation direction.

Alternatively, the thread height of the trapezoidal screw thread portion may be fixed in the rotation direction, and the reduced screw thread portion may be configured to gradually increase in height in the anti-driving rotation direction.

The screw thread angle of the external screw is set at 60°, in accordance with JIS standards, but may also be not less than 15° and not more than 45°. This is effective when the external screw member is fastened to a member that may crack or whiten during driving, such as a resin or CFRP member.

Alternatively, the screw thread angle of the external screw may form an asymmetrical screw thread having a pressure side flank angle smaller than a clearance side flank angle.

By reducing the pressure side flank angle, axial force can be distributed in a perpendicular direction to the central axis of the screw, and as a result, greater axial force can be received.

According to the present disclosure, as described above, even when the step portion and the transition screw thread portion in the maximum diameter portion mate with an internal thread formed in a pilot hole or a pre-formed internal thread of a nut or the like such that axial force is applied, force concentration on the apex side of the maximum diameter portion can be alleviated, thereby eliminating the risk of the internal thread breaking. Further, even when the external screw member is screwed into a deep pilot hole or a long internal thread, by providing the step portion and the transition screw thread portion on the parallel screw portion, an increase in driving torque can be suppressed.

DRAWINGS

Figure 1B:
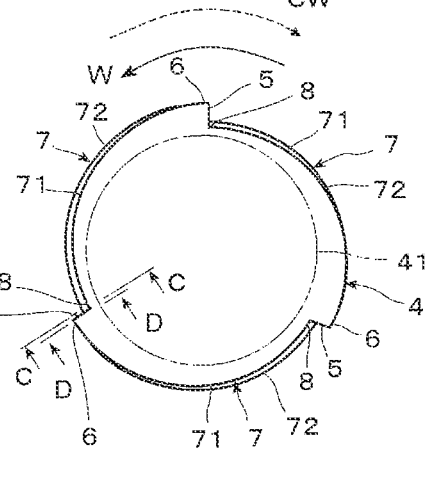
Figure 1D:
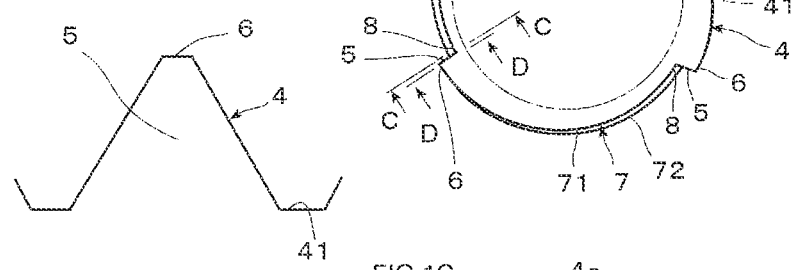
Figure 1C:
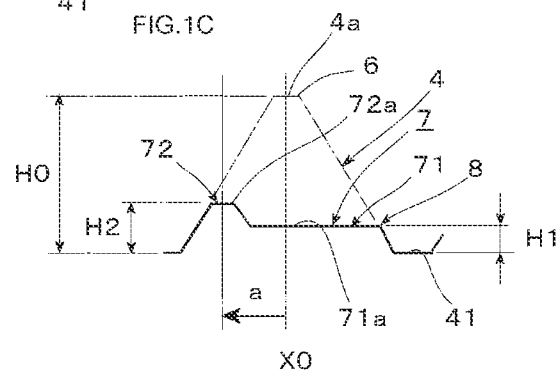
Figure 3A:
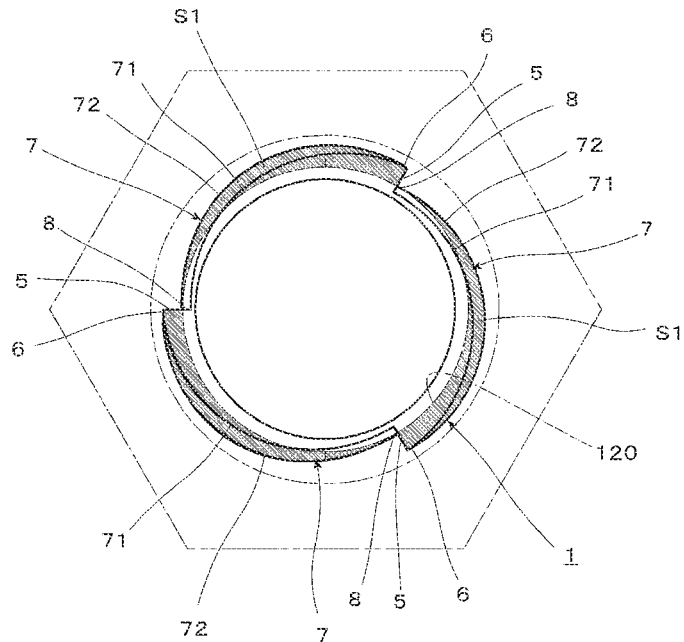
Figure 3B:
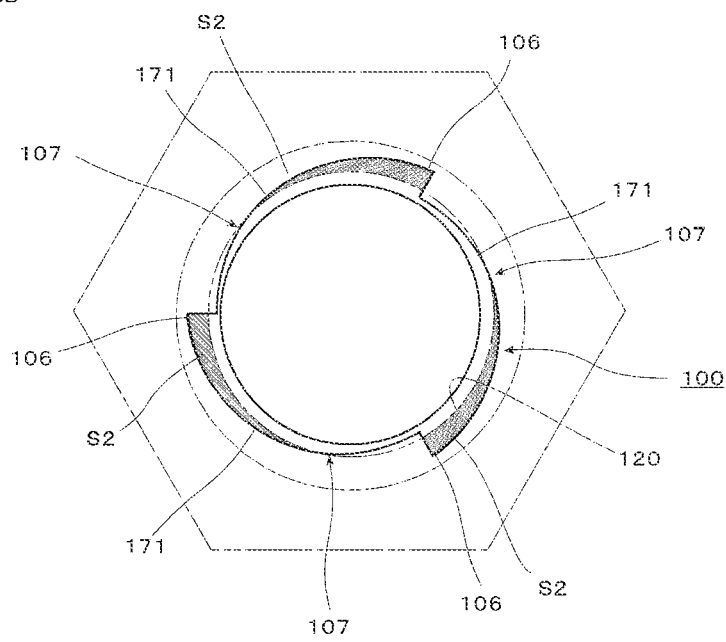
Figure 4A:
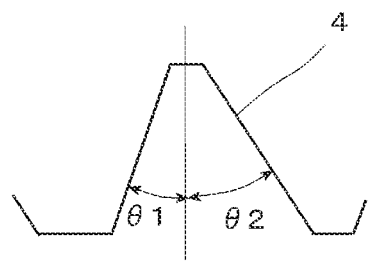
Figure 4B:
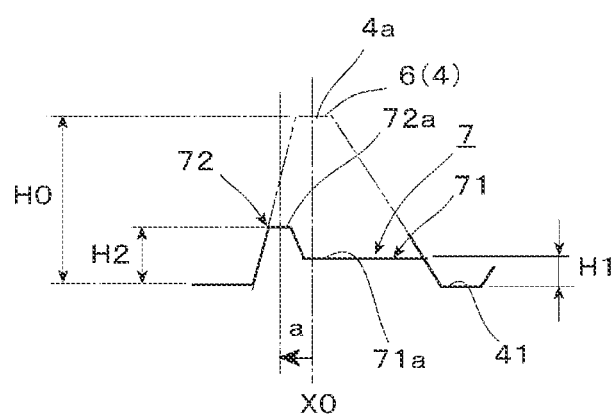

FIGS. 1A to 1D show an external screw member according to an embodiment of the present disclosure, FIG. 1A being a view showing an overall configuration thereof, FIG. 1B being a view showing an arrangement of a transition screw thread portion and a maximum diameter portion on one turn of a screw thread, FIG. 1C being a C-C sectional view of the screw thread in the maximum diameter portion of FIG. 1B, and FIG. 1D being a D-D sectional view of the screw thread in the maximum diameter portion of FIG. 1B;

FIG. 2A is a perspective pattern diagram showing the structure of the transition screw thread portion in rectilinear form, FIG. 2B is a view seen in the direction of an arrow B in FIG. 2A, FIG. 2C is a perspective view showing another example configuration of the transition screw thread portion, and FIG. 2D is a view seen in the direction of an arrow D in FIG. 2C;

FIG. 3A is an illustrative view showing a contact state between the external screw member of this embodiment and an internal thread on each turn of the screw thread, and FIG. 3B is an illustrative view showing a contact state between an external screw member according to a comparative example and an internal thread on each turn of the screw thread; and FIGS. 4A and 4B shows an embodiment in which flank angles on a pressure side and a clearance side of the screw thread are modified, FIG. 4A being a view corresponding to FIG. 1D and FIG. 4B being a view corresponding to FIG. 1C.

DETAILED DESCRIPTION

The present disclosure will be described below on the basis of an embodiment shown in the figures.

First, referring to FIGS. 1A and 1B, an overall configuration of an external screw member according to an embodiment of the present disclosure will be described. FIG. 1A is a view showing the overall configuration of the external screw member, and FIG. 1B is a view showing the shape of a screw thread on each turn.

An external screw member 1 includes a head portion 10 and a screw shaft 11, and the screw shaft 11 includes a parallel screw portion 2 and a tapered screw portion 3 provided on the tip end side of the parallel screw portion 2. A plurality of sets of a maximum diameter portion 6 and a transition screw thread portion 7 are formed on a screw thread 4 (a normal screw thread portion) provided on the parallel screw portion 2 and the tapered screw portion 3, the maximum diameter portion 6 having a step portion 5 in a position that forms a rear side relative to a driving rotation direction W and the transition screw thread portion 7 increasing gradually in diameter from the step portion 5 toward the maximum diameter portion 6, which is adjacent thereto in an anti-driving rotation direction CW.

In the example shown in the figures, on the screw thread 4, as shown in FIG. 1B, the transition screw thread portion 7 is arranged at predetermined equal intervals in a plurality of circumferential direction locations, three locations in this embodiment, on each turn from the tapered screw portion 3 to the parallel screw portion 2. In this example, the transition screw thread portion 7 is formed over the entire length of the parallel screw portion 2 but may be formed only on the tapered screw portion 3 or from the tapered screw portion 3 to a part of the parallel screw portion 2. Alternatively, the transition screw thread portion 7 may be formed only on the parallel screw portion 2. Basically, the present disclosure includes cases in which the transition screw thread portion 7 is formed on the parallel screw portion 2 and/or the tapered screw portion 3. The transition screw thread portions 7 in three locations on one turn are provided at equal intervals and in phase with each other in the circumferential direction.

When the step portion 5, the maximum diameter portion 6, and the transition screw thread portion 7 are counted as a single set, not less than two sets and not more than eight sets are preferably provided on each turn. When fewer than two sets are provided, the effect of alleviating axial force concentration decreases, and when more than eight sets are provided, the effect of reducing the driving torque decreases.

The present disclosure is configured such that a reduced screw thread portion 72 forming a top portion of the transition screw thread portion 7 is positioned at an offset toward the pressure side, or in the example shown in the figures the head portion 10 side, relative to a position of a regular screw pitch position in a minimum diameter portion 8 of the step portion 5, and transitions to the regular screw pitch as the diameter thereof in the anti-driving rotation direction CW increases.

Next, referring to FIGS. 1C and 1D, the configuration of the transition screw thread portion 7, which is a feature of the present disclosure, will be described.

As shown in FIG. 1C, the screw thread shape of the transition screw thread portion 7 in the minimum diameter portion 8 (the base position of the step portion 5) has a sectional shape in which a trapezoidal screw thread portion 71, which is continuous with and has the same pitch as the screw thread 4, and the reduced screw thread portion 72, which partially projects from a top portion 71a of the trapezoidal screw thread portion 71, are stacked. In the example shown in the figures, a top portion 72a of the reduced screw thread portion 72 also takes a trapezoidal screw thread shape, but the shape thereof is not limited to a trapezoid, and various top portion shapes, such as a triangular shape or an arc shape, may be used.

The trapezoidal screw thread portion 71 is shaped such that flank surfaces thereof on the pressure side (the head portion 10 side) and a clearance side (a screw tip side) are continuous with a flank surface of the screw thread 4 and the screw thread 4 is cut away.

The thread angle of the screw thread 4 may be set at 60°, in accordance with JIS standards, or between 15° and 45° inclusive, or as an asymmetrical screw thread. In this embodiment, the flank surfaces on the pressure side and the clearance side have the same angle and are therefore symmetrical. In the example shown in the figures, the flank angles on the pressure side and the clearance side of the reduced screw thread portion 72 are also identical to the angles of the trapezoidal screw thread portion, and the flank surface on the pressure side is continuous with an extension surface of the pressure side flank surface of the trapezoidal screw thread portion 71.

The thread height of the trapezoidal screw thread portion 71 of the transition screw thread portion 7 in the minimum diameter portion 8, or in other words a thread height H1 from a screw root portion 41 of the screw thread 4, is set at not less than 10% and not more than 50% of a thread height H0 of the maximum diameter portion 6 (which is the same as the thread height of the screw thread 4).

Further, a screw thread height H2 of the minimum diameter portion 8 of the transition screw thread portion 7 (the stacked height of the trapezoidal screw thread portion 71 and the reduced screw thread portion 72) is within a range of not less than 20% and not more than 90% of the thread height H0 of the maximum diameter portion 6.

Meanwhile, in the minimum diameter portion 8 of the step portion 5, the top portion 72a of the reduced screw thread portion 72 is offset from a position X0 of the regular screw pitch of the top portion 4a of the screw thread 4 by a toward the pressure side relative to the regular screw pitch within a range not projecting from the pressure side flank surface of the trapezoidal screw thread portion 71, and the top portion 72a transitions to the position X0 of the regular screw pitch as the diameter thereof increases in the anti-driving rotation direction CW.

The position X0 of the regular screw pitch is a position on a helix drawn by the top portion 4a of the screw thread 4. The position of the top portion 72a of the reduced screw thread portion 72 is set as a position on a line that passes through the center of the top portion 72a and is orthogonal to a central axis of the screw shaft 11.

Transition of Reduced Screw Thread Portion 72

Next, referring to FIGS. 2A to 2D, the transition of the reduced screw thread portion 72 will be described. FIG. 2A is a perspective pattern diagram showing the structure of the transition screw thread portion in rectilinear form, and FIG. 2B is a view seen in the direction of an arrow B in FIG. 2A.

In the example shown in the figures, the pressure side flank surface of the reduced screw thread portion 72 is slightly offset toward the center side of the trapezoidal screw thread portion, but the basic configuration thereof is similar to FIGS. 1A to 1D. In the example shown in the figures, the top portion 71a of the trapezoidal screw thread portion 71 is an inclined surface that gradually increases in thread height from the minimum diameter portion 8 in the anti-driving rotation direction CW, and a width G thereof (the width thereof in a parallel direction to the central axis of the screw shaft 11) gradually narrows toward the maximum diameter portion 6 up to the top portion of the maximum diameter portion 6. The pressure side flank surface of the reduced screw thread portion 72 is slightly offset toward the center side of the trapezoidal screw thread portion 71, but even when the pressure side flank surface of the reduced screw thread portion 72 is not flush with the pressure side flank surface of the trapezoidal screw thread portion 71, the pressure side flank surface of the trapezoidal screw thread portion 71 is subjected to compression deformation by the axial force generated during tightening, whereby the step therebetween is eliminated, and as a result, the contact range also widens on the reduced screw thread portion 72. Moreover, the reduced screw thread portion 72 approaches the pressure side flank surface of the trapezoidal screw thread portion 71 as the diameter thereof increases in the anti-driving rotation direction CW, and therefore a wider contact area with an internal thread can be secured than with a conventional product. The top portion 72a of the reduced screw thread portion 72, meanwhile, is configured such that a thread height H3 thereof from the top portion 71a of the trapezoidal screw thread portion 71 gradually decreases toward the maximum diameter portion 6, the screw thread height H2 of the minimum diameter portion 8 (the stacked height of the trapezoidal screw thread portion 71 and the reduced screw thread portion 72) gradually increases toward the maximum diameter portion 6, and in the top portion of the maximum diameter portion 6, the top portion 72a of the reduced screw thread portion 72 becomes integrated with the trapezoidal screw thread portion 71 so as to transition to the regular screw pitch.

As another transition, as shown in FIG. 2C, for example, with respect to the trapezoidal screw thread portion 71, the thread height H1 of the top portion 71a of the trapezoidal screw thread portion 71 from the screw root portion 41 may remain at a fixed thread height toward the maximum diameter portion 6, while the thread height H3 of the reduced screw thread portion 72 (the height from the top portion 71a of the trapezoidal screw thread portion 71) may increase gradually in the anti-driving rotation direction CW and a width F thereof (the width thereof in a parallel direction to the central axis of the screw shaft 11) may increase so that the reduced screw thread portion 72 takes an identical thread shape to the screw thread 4 in or slightly before the maximum diameter portion 6.

Next, referring to FIGS. 3A and 3B, actions of the external screw member 1 according to the above embodiment will be described.

FIG. 3A is an illustrative view showing a contact state between the external screw member 1 of this embodiment and an internal thread 120 on each turn of the screw thread on the pressure side when the external screw member 1 and the internal thread 120 are mated to an extent at which axial force is applied. FIG. 3B is an illustrative view showing a contact state between an external screw member 100 of a comparative example and the internal thread 120 on each turn of the screw thread. Contact regions are shaded. Note that although these figures show an example of a case in which the external screw member 1 is mated with the internal thread 120 of a nut on which the internal thread is formed in advance, a case in which the external screw member 1 is used as a tapping screw is similar.

Contact regions S1 (the shaded regions in the figures) between the transition screw thread portion 7 and the internal thread 120 contact the internal thread 120 over substantially the entire circumference through the maximum diameter portion 6, the step portion 5, and the transition screw thread portion 7 by an amount realized by adding the reduced screw thread portion 72, which is offset toward the pressure side, to the trapezoidal screw thread portion 71. In the example shown in the figures, the diameter of the reduced screw thread portion 72 in the minimum diameter portion 8 of the transition screw thread portion 7 is substantially identical to the inner diameter of the formed internal thread 120, and therefore, in the minimum diameter portion, the contact regions S1 are partially interrupted. However, by making the diameter of the reduced screw thread portion 72 larger than the inner diameter of the internal thread 120, the contact regions are uninterrupted over the entire circumference. Hence, even when axial force is applied during mating, force concentration on the apex side of the maximum diameter portion 6 can be alleviated, thereby eliminating the risk of the internal thread 120 breaking. Accordingly, limitations on the position in which to provide the step portion 5 can be eliminated, with the result that the step portion 5 is not limited to the tapered screw portion 3 and can be provided on the parallel screw portion 2 that is fitted to the internal thread 120 or over the entire region of the screw.

In the external screw member 100 according to the comparative example, shown in FIG. 3B, on the other hand, a transition screw thread portion 107 is formed only from a trapezoidal screw thread portion 171, and therefore contact regions S2 with the internal thread 120 exist only in the vicinity of the maximum diameter portion 106. Hence, partial contact is realized locally in three circumferential direction locations, and as a result, when the axial force increases, stress is concentrated in the contact portions, making it impossible to increase the tightening force.

Other Embodiments

In the example described in the above embodiment, the thread shape of the screw thread 4 is a symmetrical shape in which the pressure side flank angle and the clearance side flank angle are identical, but as shown in FIGS. 4A and 4B, the screw thread 4 may be an asymmetrical screw thread in which a pressure side flank angle 81 is smaller than a clearance side flank angle 82. Since only the flank angles are different and all other configurations are identical to those of the above embodiment, identical constituent parts have been allocated identical reference symbols, and description thereof has been omitted.

In the example shown in the figures, the flank angles of the trapezoidal screw thread portion 71 and the reduced screw thread portion 72 of the transition screw thread portion 7 are set similarly to the flank angles of the screw thread 4 so that the pressure side flank angle 81 is smaller than the clearance side flank angle 82.

As described above, the present disclosure can be applied widely in applications other than a tapping screw, such as a bolt that is screwed into a nut or the like in which a coating is adhered to the internal thread, whereby, during driving, friction between contact surfaces can be reduced, enabling a reduction in driving torque, and during tightening, a high axial force (fastening force) and stability can be realized. The external screw member of the present disclosure is particularly effective when screwed into an internal thread coated with a thick film, in which contact friction tends to be high, leading to an increase in driving torque.

Note that although the transition screw thread portion 7 is constituted by the trapezoidal screw thread portion 71 and the reduced screw thread portion 72 in the above embodiment, the thread shape of the trapezoidal screw thread portion 71 that serves as a base is not limited to a trapezoidal shape and may be formed in a shape in which the top portion 71a is a curved projection or a curved recess or the like, for example. Alternatively, the trapezoidal screw thread portion 71 may be eliminated so that the transition screw thread portion 7 is constituted only by the reduced screw thread portion 72 shown in FIG. 2C, for example. Basically, the transition screw thread portion 7 may be configured as desired as long as the top portion of the transition screw thread portion is positioned at an offset toward the pressure side relative to the position of the regular screw pitch in the minimum diameter portion of the step portion, and transitions to the regular screw pitch as the diameter thereof increases in the anti-driving rotation direction.

What is claimed is:

1. An external screw member comprising a parallel screw portion and a tapered screw portion provided on a side further toward a tip end than the parallel screw portion, wherein a plurality of sets of a step portion and a transition screw thread portion are provided on at least one of the parallel screw portion and the tapered screw portion, the step portion having a reduced thread height in a radial direction and the transition screw thread portion gradually increasing in diameter from the step portion in an anti-driving rotation direction so as to reach a maximum diameter portion of the transition screw thread portion, and a top portion of the transition screw thread portion in a minimum diameter portion of the step portion is positioned at an offset toward a pressure side relative to a position of a screw pitch of the maximum diameter portion of the transition screw thread portion, and the top portion of the transition screw thread portion transitions to the maximum diameter portion as the diameter thereof increases in the anti-driving rotation direction.

2. The external screw member according to claim 1, wherein a screw thread height of the minimum diameter portion of the transition screw thread portion is within a range of not less than 20% and not more than 90% of a screw thread height of a maximum diameter portion.

3. The external screw member according to claim 1, wherein the number of sets of the plurality of sets of the step portion and the transition screw thread portion is set at not less than two and not more than eight on each turn of a screw thread portion.

4. The external screw member according to claim 1, wherein the transition screw thread portion includes a trapezoidal screw thread portion having a same screw pitch as the maximum diameter portion of the transition screw thread portion, and a reduced screw thread portion that is provided on a top portion of the trapezoidal screw thread portion, is offset toward the pressure side relative to the screw pitch of the maximum diameter portion of the transition screw thread portion, and forms a top portion of the transition screw thread.

5. The external screw member according to claim 4, wherein a thread height of the trapezoidal screw thread portion is set at not less than 10% and not more than 50% of the thread height of the maximum diameter portion of the transition screw thread portion.

6. The external screw member according to claim 4, wherein the reduced screw thread portion is offset toward the pressure side relative to the screw pitch of the maximum diameter portion of the transition screw thread portion within a range not projecting from a pressure side flank surface of the trapezoidal screw thread portion.

7. The external screw member according to claim 4, wherein the thread height of the trapezoidal screw thread portion gradually increases in the anti-driving rotation direction.

8. The external screw member according to claim 4, wherein the thread height of the trapezoidal screw thread portion is fixed in a rotation direction, and the reduced screw thread portion gradually increases in height in the anti-driving rotation direction.

9. The external screw member according to claim 1, wherein a screw thread angle of the external screw is not less than 15° and not more than 45°.

10. The external screw member according to claim 1, wherein the screw thread of the external screw is an asymmetrical screw thread having a pressure side flank smaller than a clearance side flank angle.

11. The external screw member according to claim 2, wherein the number of sets of the plurality of sets of the step portion and the transition screw thread portion is set at not less than two and not more than eight on each turn of a screw thread portion.

12. The external screw member according to claim 2, wherein the transition screw thread portion includes a trapezoidal screw thread portion having the screw pitch of the maximum diameter portion of the transition screw thread portion, and a reduced screw thread portion that is provided on a top portion of the trapezoidal screw thread portion, is offset toward the pressure side relative to the screw pitch of the maximum diameter portion of the transition screw thread portion, and forms a top portion of the transition screw thread.

13. The external screw member according to claim 5, wherein the reduced screw thread portion is offset toward the pressure side relative to the screw pitch of the maximum diameter portion of the transition screw thread portion within a range not projecting from a pressure side flank surface of the trapezoidal screw thread portion.

14. The external screw member according to claim 5, wherein the thread height of the trapezoidal screw thread portion gradually increases in the anti-driving rotation direction.

15. The external screw member according to claim 5, wherein the thread height of the trapezoidal screw thread portion is fixed in a rotation direction, and the reduced screw thread portion gradually increases in height in the anti-driving rotation direction.

16. The external screw member according to claim 3, wherein the transition screw thread portion includes a trapezoidal screw thread portion having the screw pitch of the maximum diameter portion of the transition screw thread portion, and a reduced screw thread portion that is provided on a top portion of the trapezoidal screw thread portion, is offset toward the pressure side relative to the screw pitch, and forms a top portion of the transition screw thread.

17. The external screw member according to claim 6, wherein the thread height of the trapezoidal screw thread portion gradually increases in the anti-driving rotation direction.

18. The external screw member according to claim 6, wherein the thread height of the trapezoidal screw thread is fixed in a rotation direction, and the reduced screw thread portion gradually increases in height in the anti-driving rotation direction.

* * * * *